United States Patent
Lubojasky, Jr. et al.

(10) Patent No.: US 11,053,757 B2
(45) Date of Patent: Jul. 6, 2021

(54) REMOTELY CONTROLLABLE REEL WITH CONVEYANCE FOR A WELL

(71) Applicant: HALLIBURTON ENERGY SERVICES, INC., Houston, TX (US)

(72) Inventors: Ben L. Lubojasky, Jr., Bellville, TX (US); Rami Yassine, Humble, TX (US); William G. Dillon, Houston, TX (US); Darrell Lancaster, Spring, TX (US); Jonathon J. Saner, Spring, TX (US); Pedro R. Soriano Jaquez, Spring, TX (US); Michael E. Malone, Tomball, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 102 days.

(21) Appl. No.: 16/491,599

(22) PCT Filed: May 25, 2018

(86) PCT No.: PCT/US2018/034720
§ 371 (c)(1),
(2) Date: Sep. 6, 2019

(87) PCT Pub. No.: WO2018/226439
PCT Pub. Date: Dec. 13, 2018

(65) Prior Publication Data
US 2021/0131200 A1      May 6, 2021

Related U.S. Application Data

(60) Provisional application No. 62/516,993, filed on Jun. 8, 2017.

(51) Int. Cl.
*E21B 19/22* (2006.01)
*E21B 43/26* (2006.01)

(52) U.S. Cl.
CPC .......... *E21B 19/22* (2013.01); *E21B 43/2607* (2020.05)

(58) Field of Classification Search
CPC ....... E21B 19/22; E21B 43/2607; E21B 43/26
See application file for complete search history.

(56) References Cited

U.S. PATENT DOCUMENTS

| | | | |
|---|---|---|---|
| 5,558,118 A * | 9/1996 | Mooring | A62C 27/00 137/342 |
| 5,845,708 A * | 12/1998 | Burge | B65H 51/14 166/77.3 |
| 6,502,641 B1 * | 1/2003 | Carriere | E21B 7/021 166/384 |
| 6,776,559 B1 * | 8/2004 | Peterson | F16L 1/203 405/154.1 |

(Continued)

OTHER PUBLICATIONS

International Search Report and Written Opinion dated Sep. 18, 2018, of PCT/US2018/034720, filed on May 25, 2018.

*Primary Examiner* — Shane Bomar
(74) *Attorney, Agent, or Firm* — Chamberlain Hrdlicka

(57) ABSTRACT

Various embodiments include a system to manage a tool on a conveyance from a surface of a wellbore. The system includes a remotely controllable reel to receive the conveyance about the reel and remotely controllable to distribute the conveyance into or out of the wellbore. The system also includes a crane positionable to support the conveyance between the reel and the wellbore.

20 Claims, 17 Drawing Sheets

(56) References Cited

U.S. PATENT DOCUMENTS

| | | |
|---|---|---|
| 2006/0278394 A1 | 12/2006 | Stover |
| 2011/0140907 A1 | 6/2011 | Louden |
| 2013/0175048 A1* | 7/2013 | Goode .................... E21B 19/22 |
| | | 166/379 |
| 2017/0016287 A1 | 1/2017 | Dion |
| 2017/0022764 A1* | 1/2017 | Backer .................... E21B 19/22 |
| 2017/0139392 A1 | 5/2017 | Abou-Assaad |
| 2017/0145760 A1 | 5/2017 | Poyet |

* cited by examiner

REMOTELY CONTROLLABLE REEL WITH CONVEYANCE FOR A WELL

BACKGROUND

This section is intended to provide relevant background information to facilitate a better understanding of the various aspects of the described embodiments. Accordingly, it should be understood that these statements are to be read in this light and not as admissions of prior art.

In a well perforation operation, perforating guns may be run into a well to form perforations in the wellbore. Multiple components at the surface may be utilized to prepare for running the perforating guns and running the perforating guns into the well. It is desirable to improve the efficiency of these components at the surface.

BRIEF DESCRIPTION OF THE DRAWINGS

Embodiments of the remotely controllable reel with conveyance for a well are described with reference to the following figures. The same numbers are used throughout the figures to reference like features and components. The features depicted in the figures are not necessarily shown to scale. Certain features of the embodiments may be shown exaggerated in scale or in somewhat schematic form, and some details of elements may not be shown in the interest of clarity and conciseness.

DETAILED DESCRIPTION

The present disclosure provides systems and methods for remotely controlling a reel with a spooled conveyance and tool for a well. For example, the reel may be remotely controlled from within a command center or a handheld device. Further, remotely controlling the reel may enable the reel to be positioned on a crane system.

Figure 1:
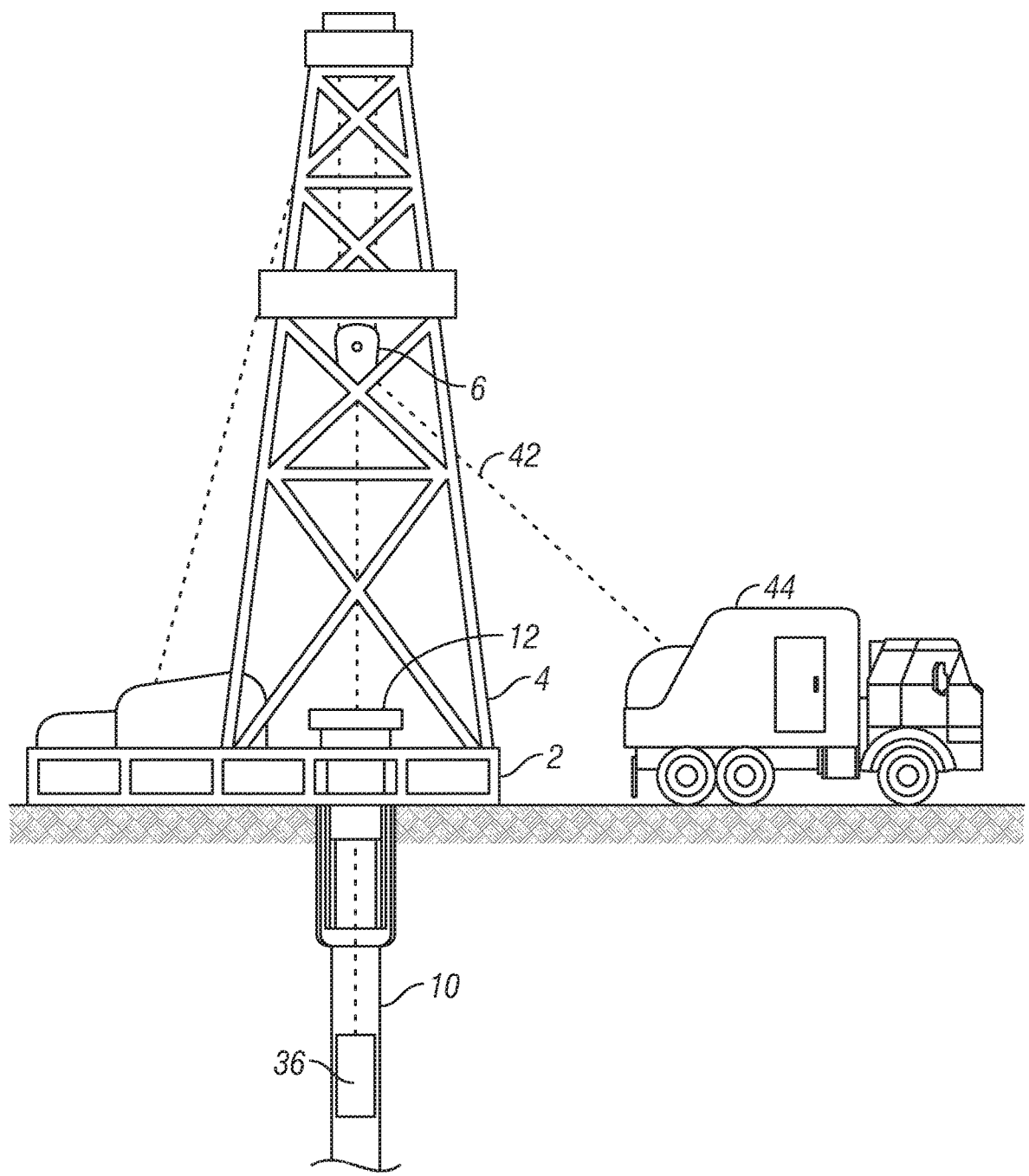
FIG. 1 is a schematic view of a wellbore servicing system, according to one or more embodiments.

The disclosed operations are best understood in the context of the larger systems in which they operate. Accordingly, FIG. 1 shows an illustrative environment using a downhole tool 36, such as for logging and/or for pump down operations (e.g., pump-and-perf). A platform 2 is equipped with a derrick 4 that supports a hoist 6. The hoist 6 is used for raising and lowering a conveyance 42 through a wellhead 12 and into and out of a wellbore 10.

The conveyance 42 may be any various conveyance, such as a cable, wireline, E-line, Z-line, jointed pipe, coiled tubing, casing or liner string, for example. Depending on the type of conveyance, the operation, and the environment, a motor driven winch and other associated equipment may be supported at the rig floor for extending the conveyance 42 into the wellbore 10. While the exemplary operating environments include a stationary drilling rig for lowering tools within a land-based wellbore, one of ordinary skill in the art will readily appreciate that mobile workover rigs, well servicing units, such as coiled tubing units, and the like, could also be used. It should be understood that other operational environments are contemplated, such as offshore wells. Although the wellbore 10 is shown to have a vertical extension, other wellbores may have a horizontal extension as well.

Referring still to FIG. 1, a surface control facility 44 (e.g., movable structure) may be used to deploy and retrieve the tool 36 using the conveyance 42, in which the conveyance 42 may be wound around a reel at the surface control facility 44. The conveyance 42 may include conductors for transporting power to the tool 36. Conductors of the conveyance 42 also may enable communications between the tool 36 and the surface control facility 44 (e.g., movable structure in this example). In alternative embodiments, wireless communications may be implemented between the tool 36 and the surface control facility 44. The surface control facility 44 operates the tool 36 and/or gathers log data or other sensor data from the tool 36.

In the stimulation treatment or a completion of a well, it is expected to have multiple discrete services (e.g., services provided by discrete and separate provides): wireline services (i.e., conveyance 42 described above), pump down services to deploy a tool into the well, crane services, pressure control and plug services, in addition to a variety of other services and service providers not explicitly mentioned here. These services could be executed by multiple service providers that all work on a stimulated or completed well or wells on the same pad or site. With multiple services and service providers, the efficiency of the system and treatment of a well may overall be relatively low. While individual services and components of the treatment may be improved, the overall system performance may not necessarily improve unless efficiencies and communication between the services and service providers also improves. For example, by having discrete services, this may create task redundancies for each individual service or service provider. Further, multiple discrete services and components generate safety concerns, such as individuals entering pressure zones, armed explosive areas, hazardous areas, and general miscommunication or lack of communication which may lead to one or more safety risks (e.g., operating the wrong valve).

Figure 2:
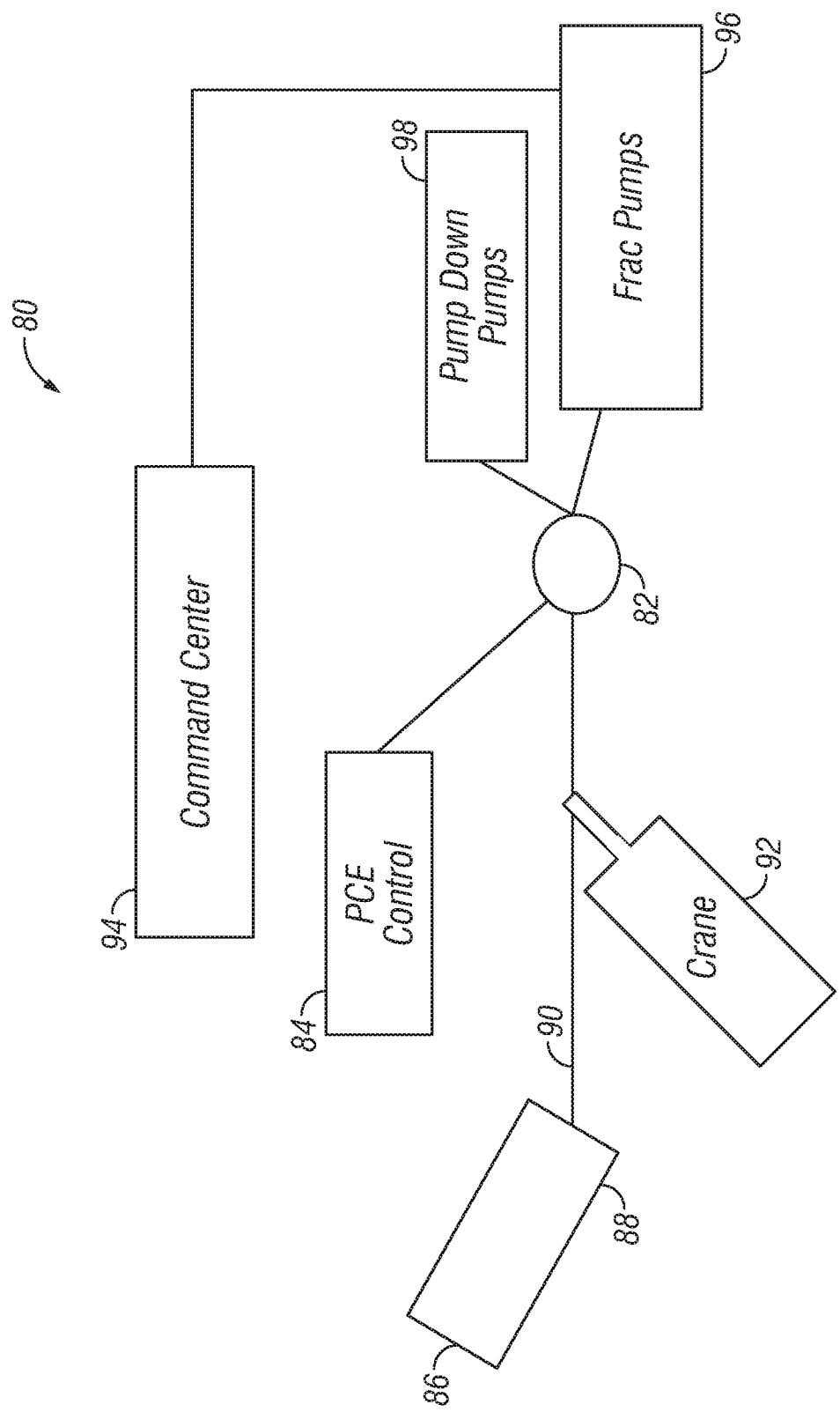
FIG. 2 is schematic view of a first system for managing the treatment of a well, according to one or more embodiments.

FIG. 2 illustrates a schematic view of a first example system 80 for managing the treatment of a well, such as for a plug and perforation service or job to be performed on a well. A wellhead housing 82 is placed upon the well, and pressure control equipment 84 (PCE) is positioned upon or connected to the wellhead housing 82 to manage and control pressure and fluid flow into and out of the well. A movable structure 86; e.g., a movable structure, includes a reel 88 to deploy a conveyance 90, such as a wireline (shown as a line extending between the wellhead housing 82 and the movable structure 86), into the well through the wellhead housing 82 and potentially also through the PCE 84. The movable structure 86 is used to control the reel 88, such as rotating the reel 88 when deploying and retrieving the conveyance 90 and a tool coupled to the conveyance 90 within the wellbore 82. A crane 92 is included between the reel 88 and the wellbore 82 to support the conveyance 90. This includes raising the conveyance 90 from the movable structure 86 and above the wellbore 82 to give the conveyance 90 a desired angle with respect to the wellbore 82 for deployment or retrieval. A command center 94 is included in the system 80 for, amongst other activities, managing fluid flow within the well. The command center 94 may include control equipment, monitoring equipment, laboratory equipment, power equipment, and/or climate control equipment, such as computers, display devices, transmitters (e.g., wireless, electric, or hydraulic transmitters), printers, generators, air conditioning units, a water supply, heaters, seating, etc. In one or more embodiments, the command center 94 in accordance with the present disclosure may include a mobile command station. Accordingly, the command center 94 may perform multiple wellsite operations in a single location. For example, one or more fracturing pumps 96 may be included to pump fracturing fluid into the well. The command center 94 may be used to remotely control the fracturing pumps when pumping fracturing fluid into the well. Further, one or more pump down pumps 98 may be included to pump fluid into the well to deliver the tool to a desired location within the well.

Figure 3:
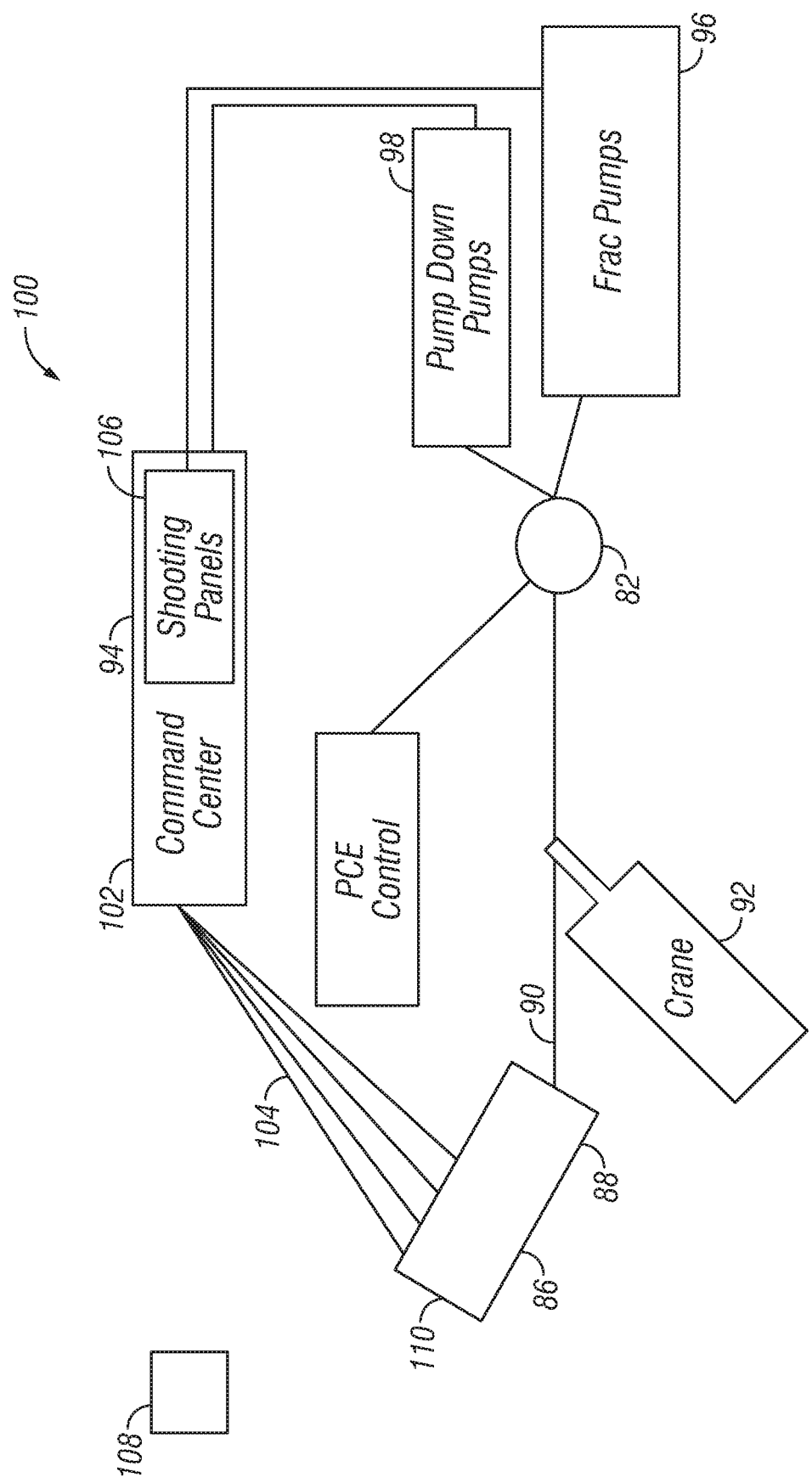
FIG. 3 is schematic view of a second system for managing the treatment of a well, according to one or more embodiments.
Figure 4:
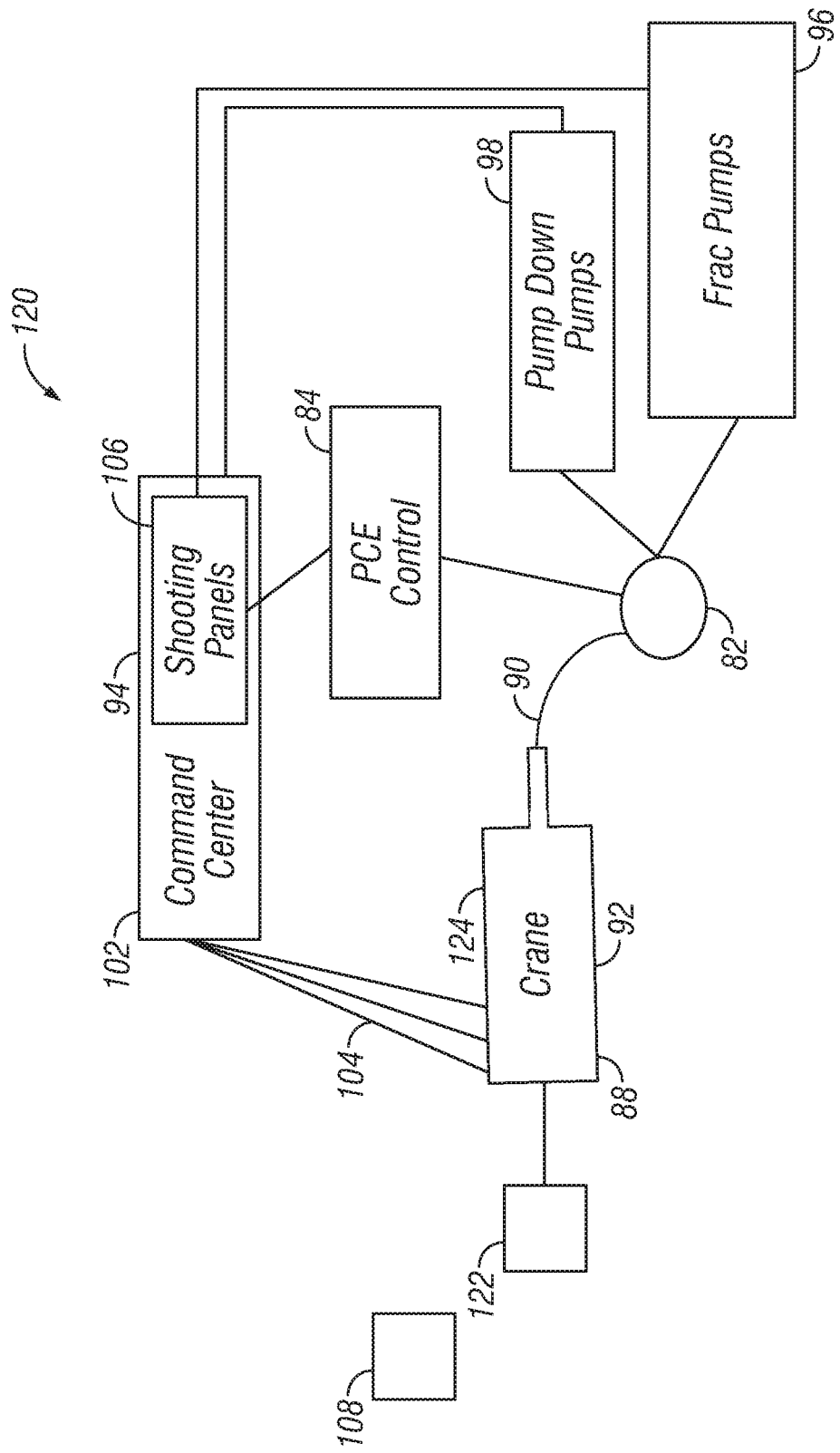
FIG. 4 is schematic view of a third system for managing the treatment of a well, according to one or more embodiments.
Figure 5:
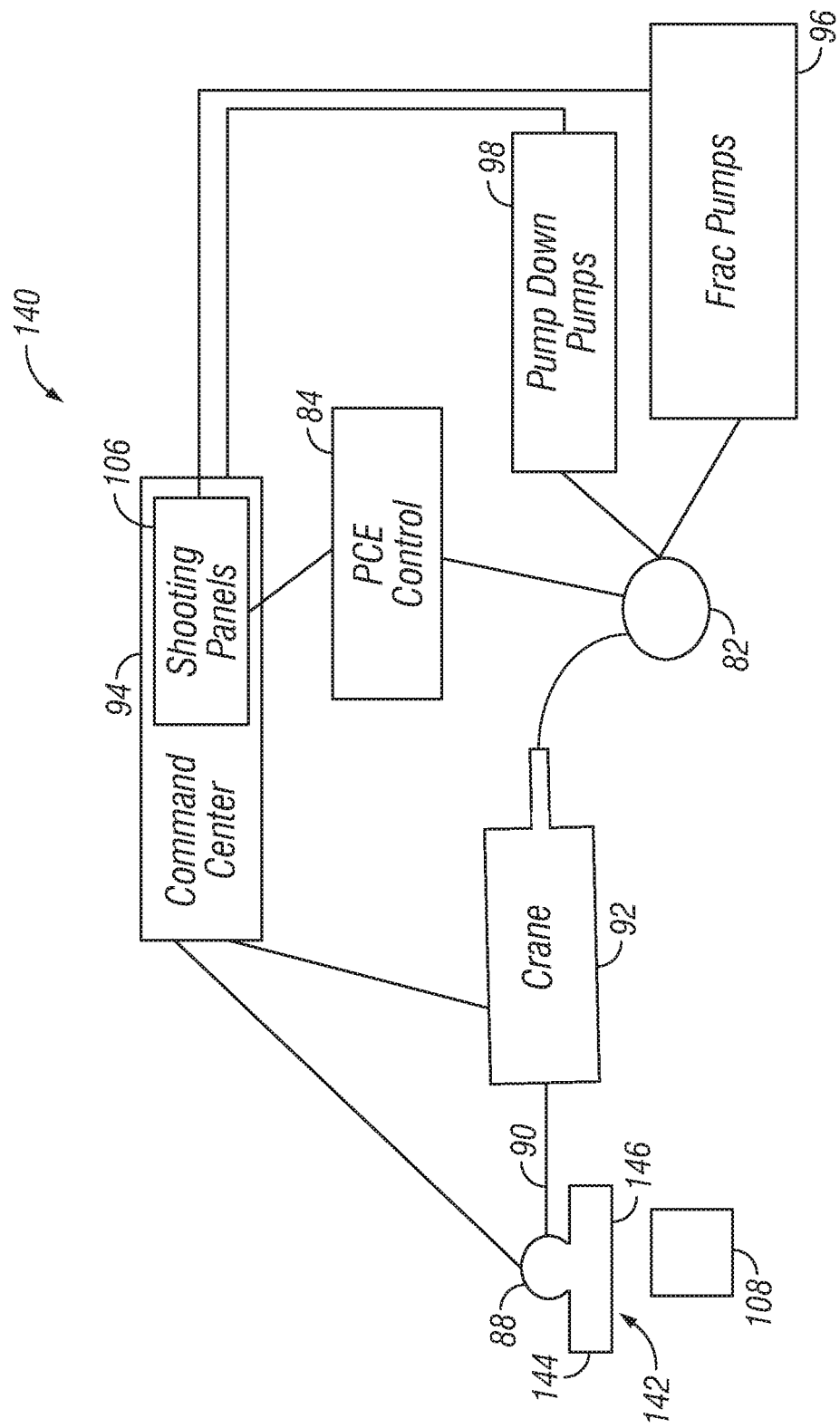
FIG. 5 is schematic view of a fourth system for managing the treatment of a well, according to one or more embodiments.

In accordance with one or more embodiments, the present disclosure looks to integrate one or more of these discrete services. This may include remotely operating the services as part of the system and manage the well completion delivery. FIGS. 3-5 provide examples of systems for managing the treatment of a well in accordance with one or more embodiments of the present disclosure. By integrating these discrete services, the present disclosure may have the advantage of a smaller foot print, reducing operational and safety risk, consolidating data gathering, creating a single point of contact for completion or other services, integrating crews, and improving efficiency on decision making and delivery of the completions job.

FIGS. 3-5 illustrate integration of one or more of the following components and/or services with each other: the command center 94, the conveyance (wireline) management (e.g., the movable structure 86, the reel 88, and the conveyance 90), the pressure control equipment 84 installation and management, and the crane 92 installation and management. One or more well completions teams, via the command center 94 controls blending, fluid, and proppants to be mixed to deliver into the well at the required pressure. The command center 94 is used to consolidate integrated well completions operations. Wireline surface systems have also been installed in the command center 94 for the command center 94 to remotely manage the wireline services (e.g., deploying or receiving the wireline with respect to the reel and well).

FIG. 3 illustrates a schematic view of a second system 100 that may include one or more modifications to improve efficiencies and any treatments performed by the second system. For example, the command center 94 may have one or more of the following modifications. The command center 94 includes a control system 102 that may be used to remotely control the reel 88 and the movable structure 86, either wirelessly or using an umbilical 104 extending between the movable structure 86 and the command center 94. The command center 94 may thus be used to remotely control the reel 88 and the conveyance 90 and the tool deployed from or received by the reel 88. The command center 94 may also be used to control the tool attached to the conveyance 90, such as by setting a plug of the tool and/or shooting a perforating gun of the tool (e.g., via one or more shooting panels 106 located within the command center 94), whereas these services would otherwise have been controlled by equipment on the movable structure 86. In the case of the movable structure 86 being a logging truck, the command center 94 may be in communication with and control all aspects of the logging truck, including being able to monitor, collect, and/or control the acquisition of operational parameters with respect to the logging truck, the reel 88, the conveyance 90, and/or the tool attached to the conveyance 90.

The command center 94 may include audio and/or video equipment for monitoring of the movable structure 86, the reel 88, the crane 92, and/or other components within the system. The audio and video equipment may provide real-time or near real-time monitoring of the various components of the system 100 to enable an operator to act with zero or minimal delay. In addition, the audio and video equipment may be placed in areas where operators would not normally have access to capture a higher definition image and sound of the operations. For example, audio (e.g., microphone) and/or video (e.g., video camera) equipment may be positioned within, on, or above the movable structure 86, the reel 88, the crane 92, and/or other locations to enable the operator to monitor the conveyance 90 (e.g., provide a bird's-eye view of the conveyance), whereas the conveyance 90 would not otherwise be visible to the operator while at the movable structure 86 and/or command center 94 or the operator may only have a worm's-eye view.

Further, with respect to FIG. 3, the movable structure 86 may include one or more of the following modifications. The movable structure 86 may have hydraulic controls for controlling the reel 88, the conveyance 90, and/or the tool attached to the conveyance 90. Electrical over hydraulic controls may then be incorporated into the movable structure 86 to enable the hydraulic controls to be remotely controlled. The movable structure 86 may be remotely controlled from the command center 94, as discussed above, and/or from a remote control 108 (e.g., remote handheld control with control equipment, such as wireless or wired communication equipment, to remotely communicate and an interactive screen to display information and receive inputs) for controlling one or more of the above identified activities. As discussed above, the movable structure 86 may include audio and/or video equipment for remote monitoring and control. A control console 110 (e.g., switch) may be included with the movable structure 86 to enable the movable structure 86 to be remotely controlled or controlled locally from the movable structure 86. Further, equipment is included within the movable structure 86 to enable acquisition of movable structure 86 operational parameters and all controls and activities that may be managed by the movable structure 86.

FIG. 4 illustrates a third system 120 for managing the treatment of a well in accordance with one or more embodiments of the present disclosure. In FIG. 4, the movable structure has been removed, and the reel 88 for managing the conveyance 90 has been moved to the crane 92. The crane 92, thus, may be used for controlling the reel 88, the conveyance 90, and/or the tool attached to the conveyance 90.

The command center 94 may be used to communicate with and control the crane 92, similar to how the command center 94 may be used to control the movable structure (when applicable). The command center 94 may be used to remotely control operations of the crane 92 and the reel 88 included on the crane 92. The command center 94 may also be used to communicate with and control the pressure control equipment 84 (e.g., remote operation of surface pressure management equipment). Further, the command center 94 may be used to communicate with, control, and/or automate the pump down pumps 98, such as when pumping down the tool and the conveyance 90 into the well.

The crane 92 may also have one or more modifications. The reel 88, now included on the crane 92, may be hydraulically operated/actuated and/or electrically operated/actuated. For example, if hydraulically operated/actuated, the hydraulic pumps and/or hydraulic fluid used to control the crane 92 may be used to control the reel 88 as well. Further, a separate pump system 122 that includes one or more pumps and/or a separate hydraulic fluid reservoir may be used to control the reel 88 from the crane 92. The crane 92 includes a frame and mounting for positioning the reel 88 upon the crane 92. Further, a reel level wind may be included on the crane 92 for facilitating (e.g., automatically) winding and unwinding of the conveyance 90 on the reel 88. The crane 92 may have hydraulic controls for controlling the functions associated with the crane 92 and/or the reel 88. Electrical over hydraulic controls may be incorporated into the crane 92 to enable the hydraulic controls to be remotely controlled. The crane 92 may be remotely controlled from the command center 94, as discussed above (e.g., via the control system 102 and/or the umbilical 104), and/or from the remote control 108 (e.g., remote handheld control with control equipment to remotely communicate and an interactive screen to display information and receive inputs) for controlling one or more of the above identified activities. The crane 92 may include audio and/or video equipment for remote monitoring and control. A control console 124 (e.g., switch) may be included with the crane 92 to enable the crane 92 to be remotely controlled or controlled locally from the crane 92. Further, equipment (e.g., accelerometers, gyroscopes, etc.) is included within the crane 92 to enable acquisition of crane operational parameters and all controls and activities that may be managed by the crane 92.

FIG. 5 illustrates a fourth system 140 for managing the treatment of a well in accordance with one or more embodiments of the present disclosure. In FIG. 5, the movable structure has been removed, and the reel 88 for managing the conveyance 90 has been moved to a separate portable or movable drum package 142, such as positioned upon a trailer and/or a skid 144. The drum package 142 may include a hydraulic motor power density coupled to a pump and/or a motor (e.g., electric or internal combustion) to control the reel 88, the conveyance 90, and/or the tool attached to the conveyance 90. The command center 94 may be used to communicate with and control the drum package 142, similar to how the command center 94 may be used to control the movable structure (when applicable).

As with the above, the reel 88, now included on the drum package 142, may be hydraulically operated/actuated and/or electrically operated/actuated. The drum package 142 includes a frame and mounting for positioning the reel 88 upon the drum package 142. In particular, the drum package 142 may include a slewing drive, frame, and mounting to enable the reel 88 to slew with the crane 92, such as when the crane 92 rotates for the reel 88 to rotate with the crane 92. Further, a reel level wind may be included on the drum package 142 for facilitating (e.g., automatically) winding and unwinding of the conveyance 90 on the reel 88. The drum package 142 may have hydraulic controls for controlling the functions associated with the reel 88. Electrical over hydraulic controls may be incorporated into the drum package 142 to enable the hydraulic controls to be remotely controlled. The drum package 142 may be remotely controlled from the command center 94, as discussed above, and/or from the remote control 108 (e.g., remote handheld control with control equipment to remotely communicate and an interactive screen to display information and receive inputs) for controlling one or more of the above identified activities. The drum package 142 may include audio and/or video equipment for remote monitoring and control. A control console 146 (e.g., switch) may be included with the drum package 142 to enable the drum package 142 to be remotely controlled or controlled locally from the drum package 142. Further, equipment is included within the drum package 142 to enable acquisition of drum package operational parameters and all controls and activities that may be managed by the drum package 142.

In one or more embodiments, the PCE 84 and/or the wellhead 82 in accordance with the present disclosure may include a wellhead connection unit (WCU), such as the ExpressKinect™ provided by Halliburton Energy Services, a wireline or conveyance adaptor, and/or a compact Hydraulic power unit that may be automated with the PCE or WCU automated. Further, pumping equipment and pumps in accordance with the present disclosure may include not only the pumps, but pump trucks, blenders, proppant delivery systems, chemical delivery systems, and/or iron (e.g., the machines and/or mechanisms for pumping and to facilitate pumping).

Referring now collectively to FIGS. 6-9, multiple embodiments are provided of a crane system 150 that includes a reel 152 positioned upon a crane 154 in accordance with one or more embodiments of the present disclosure. The crane 154, which may be a vehicle or may be positioned upon a vehicle, includes a boom 156 and a base 158 with the boom 156 movable with respect to the base 158. In particular, the boom 156 may be able to rotate with respect to the base 158, may be able to translate (e.g., raise and/or lower) with respect to the base 158, and/or may be able to telescope with respect to the base 158. Depending on the position of the reel 152 upon the crane 154 and the connection between the reel 152 and the components (e.g., boom 156 and base 158) of the crane 154, the reel 152 may also be able to rotate, translate, and/or telescope with respect to the base 158.

Figure 6:
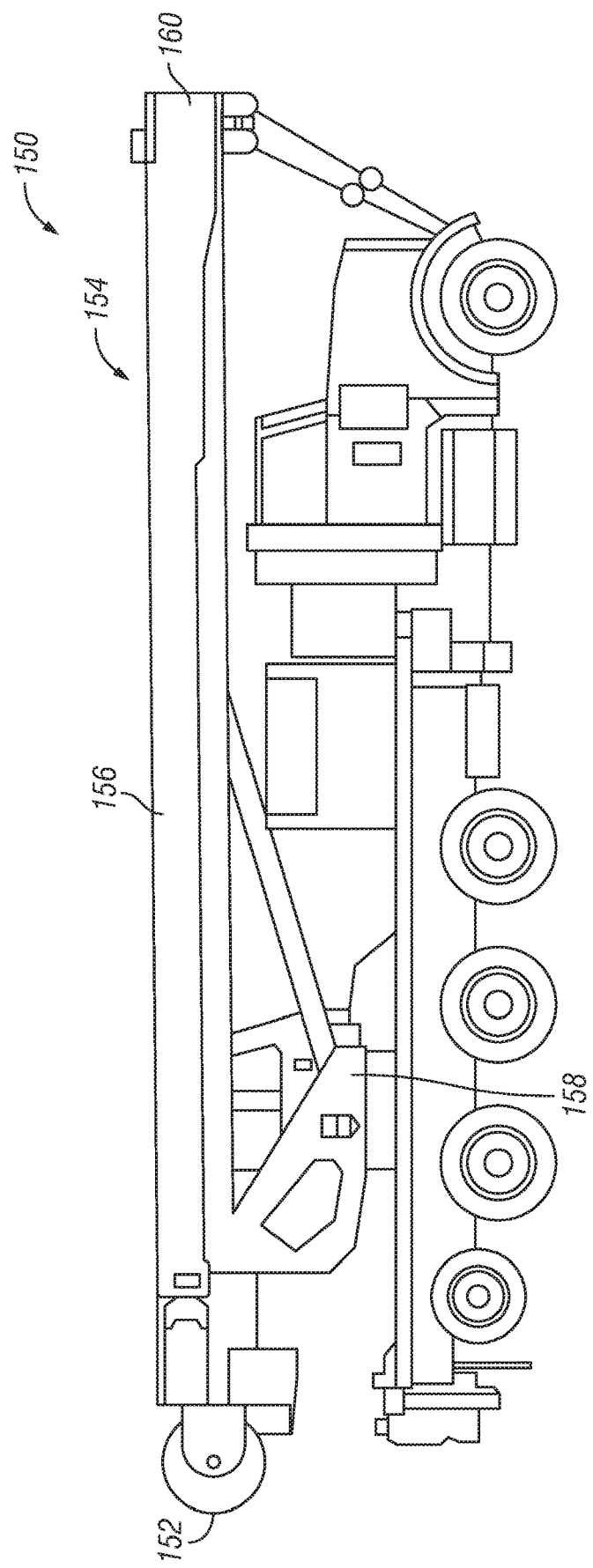
FIG. 6 illustrates a perspective view of a crane system that includes a reel on a boom of the crane system, according to one or more embodiments.

With respect to FIG. 6, the reel 152 may be positioned upon the boom 156 of the crane 154. For example, a counterweight(s) is often positioned at the end of the boom 156 opposite a sheave head 160 of the boom 156. FIG. 6 illustrates the counterweight may be removed and the reel 152 may be used to replace and/or provide the counterweight. In such an embodiment, the reel 152 may be able to rotate with the boom 156 with respect to the base 158. The reel 152 may also be able to translate (raise or lower) with the boom 156 as the boom 156 raises and lowers. For example, as the sheave head 160 of the boom 156 is raised with respect to the base 158, the reel 152 may lower with respect to the base 158, and vice-versa.

Figure 7:
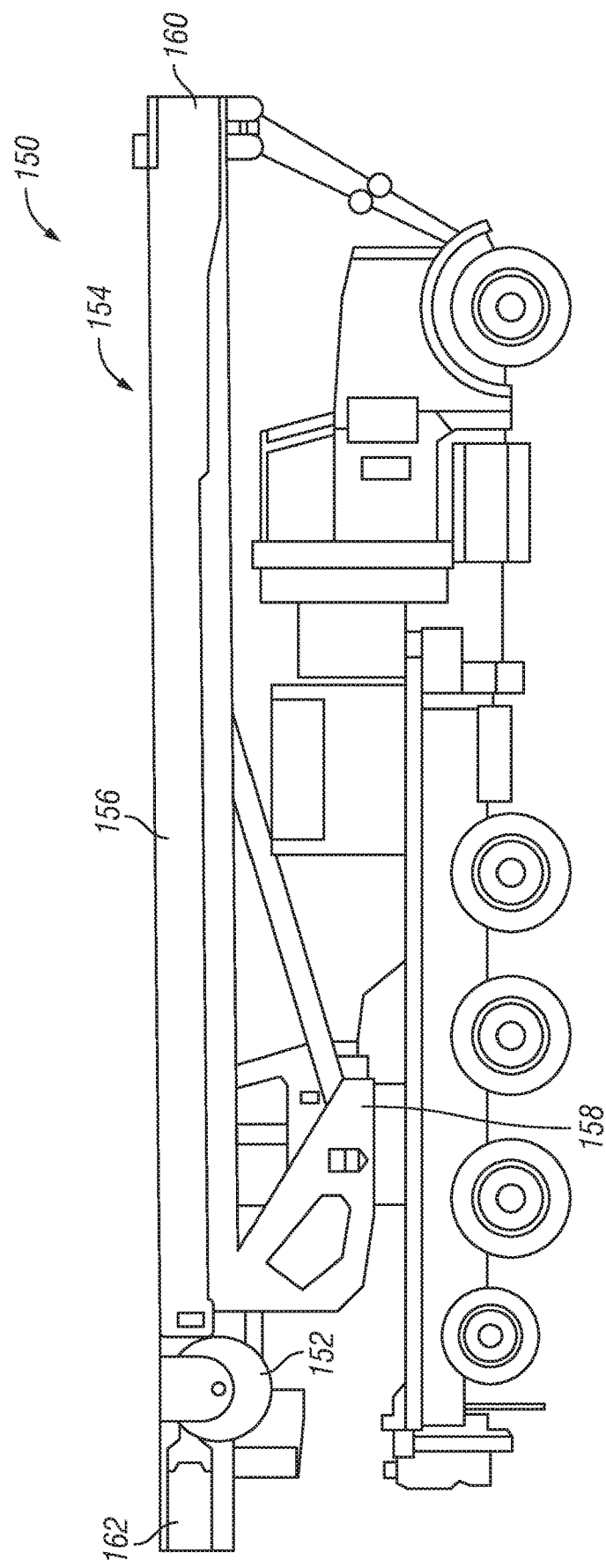
FIG. 7 illustrates a perspective view of a crane system that includes a reel and one or more motors on a boom of the crane system, according to one or more embodiments.

With respect to FIG. 7, the reel 152 may be positioned upon the boom 156 of the crane 154 still with the reel 152 used to replace and/or provide the counterweight. One or more motors 162 (e.g., hydraulic or electric motors) are provided to translate the boom 156 with respect to the base 158. In this embodiment, the one or more motors 162 may be moved and mounted behind the reel 152 with respect to the boom 156 such that the reel 152 is mounted between the one or more motors 162 and the boom 156. Further, the winch connected to or provided in the boom 156 may be replaced with the reel 152 such that the one or more motors 162 drive the reel 152 as opposed to the winch. In such an embodiment, the reel 152 may be able to rotate with the boom 156 with respect to the base 158. The reel 152 may also be able to translate (raise or lower) with the boom 156 as the boom 156 raises and lowers. For example, as the sheave head 160 of the boom 156 is raised with respect to the base 158, the reel 152 may lower with respect to the base 158, and vice-versa. Further, the reel 152 may be oriented in any suitable manner. For example, the reel 152 may be oriented such that a wireline is run on top of the boom 156, below the boom 156, or to either side of the boom 156.

Figure 8:
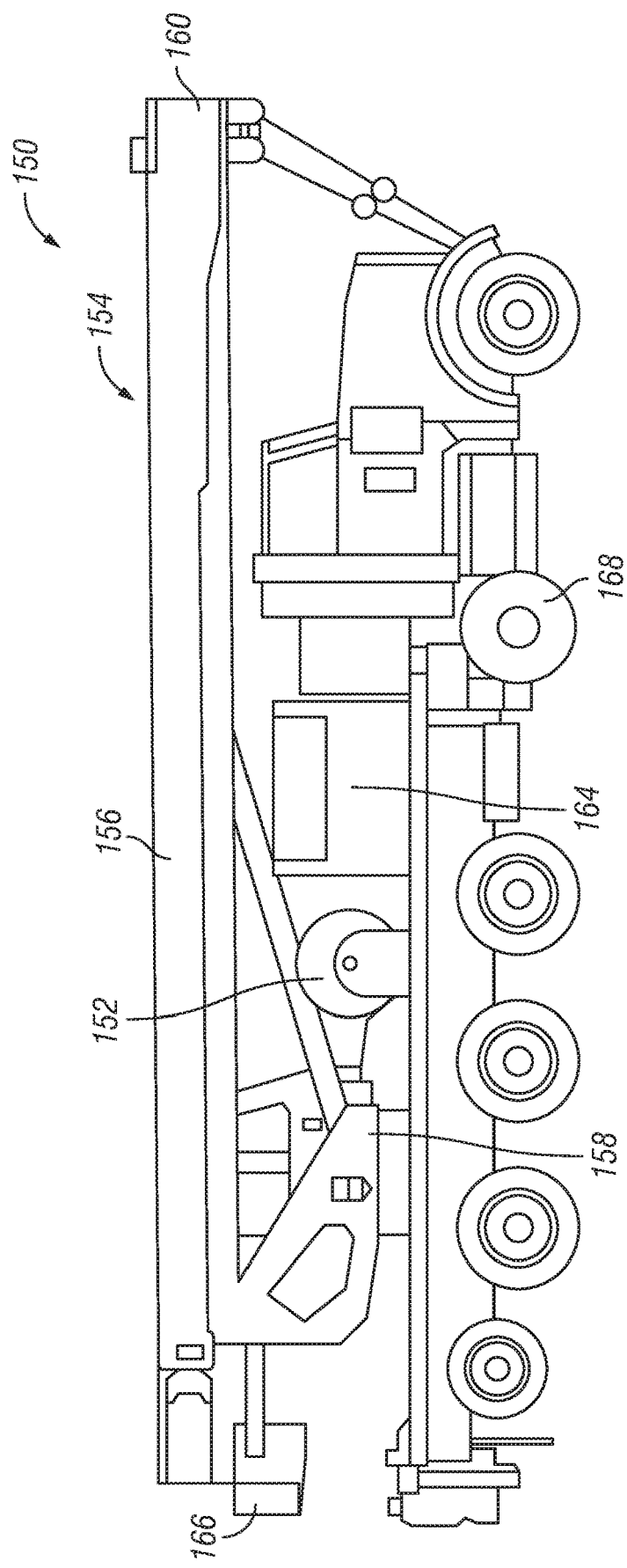
FIG. 8 illustrates a perspective view of a crane system that includes a reel next to a base of the crane system, according to one or more embodiments.

With respect to FIG. 8, the reel 152 may be positioned next to the base 158 as shown, or the reel 152 may be positioned above the base 158 to float above the base 158. In such an embodiment, the reel 152 may be coupled or connected to the boom 156 and able to rotate with the boom 156 with respect to the base 158. A plate or platform 164 may extend between and be connected between the boom 156 and the reel 152 to rigidly connect the boom 156 and the reel 152. As such, as the boom 156 rotates with respect to the base 158, the reel 152 may also rotate with the boom 156 with respect to the base 158. The reel 152, however, may not be able to translate with the boom 156 as the boom 156 raises or lowers with respect to the base 158. Further, a counterweight 166 is also included on the boom 156 opposite of the sheave head 160 as the reel 152 is no longer in a position to provide the utility of the counterweight 166. Moreover, an additional wheel assembly 168 (e.g., axle, suspension, and wheels) may be included to provide additional stability.

Figure 9:
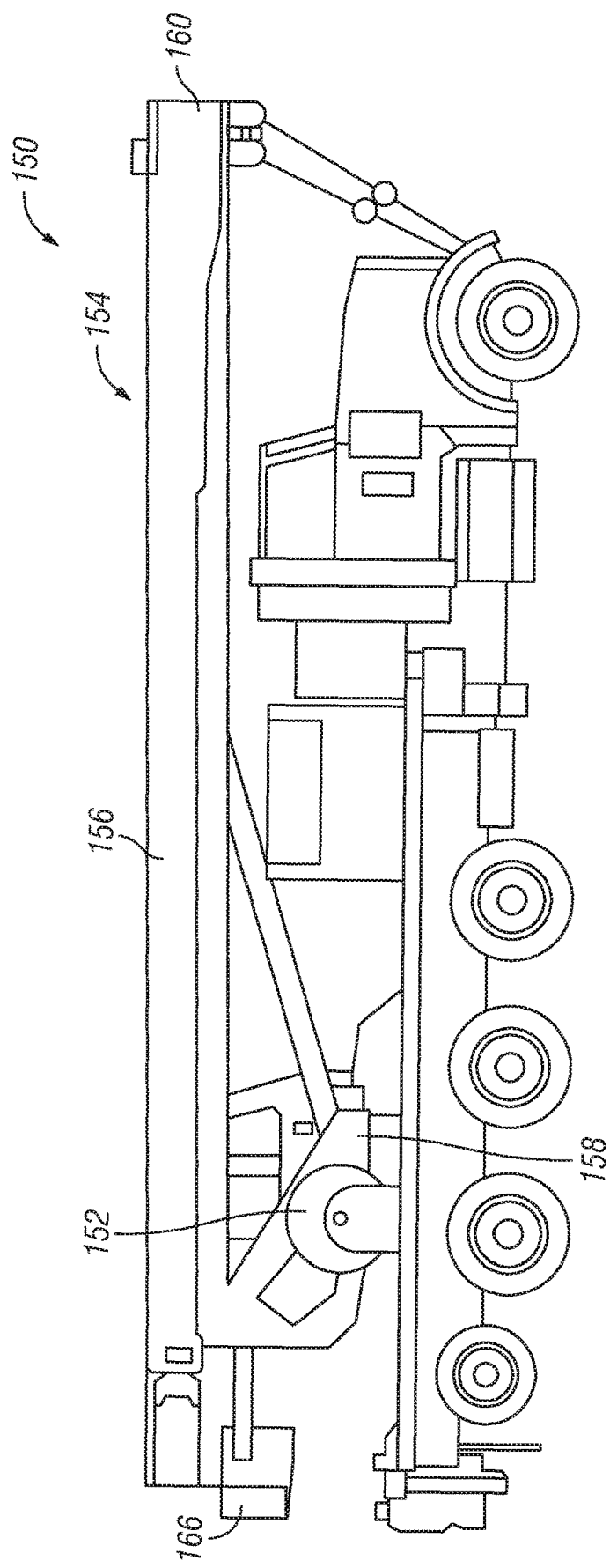
FIG. 9 illustrates a perspective view of a crane system that includes a reel on a boom of the crane system, according to one or more embodiments.

With respect to FIG. 9, the reel 152 may be positioned on the base 158, such as rigidly connected to the base 158 and/or directly connected to the base 158. In such an embodiment, the boom 156 may be able to rotate and/or translate with respect to the reel 152 and the base 158. The reel 152, however, may not be able to rotate or translate with the boom 156 as the boom 156 raises or lowers with respect to the base 158. Further, the counterweight 166 is also included on the boom 156 opposite of the sheave head 160 as the reel 152 is no longer in a position to provide the utility of the counterweight 166.

Figure 10:
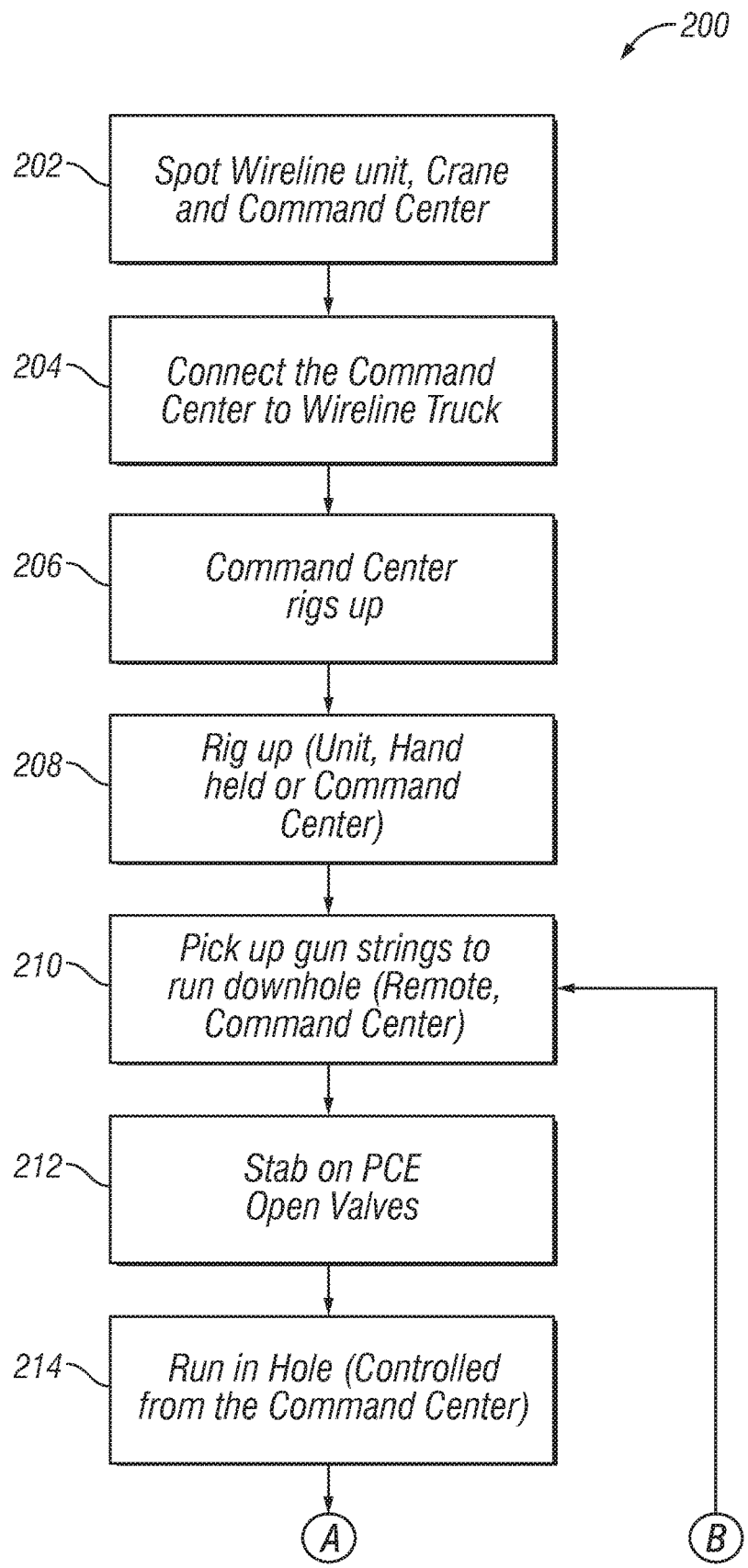
FIG. 10 illustrates a flow chart for a perforation operation according to the system of FIG. 3, according to one or more embodiments.
Figure 10:
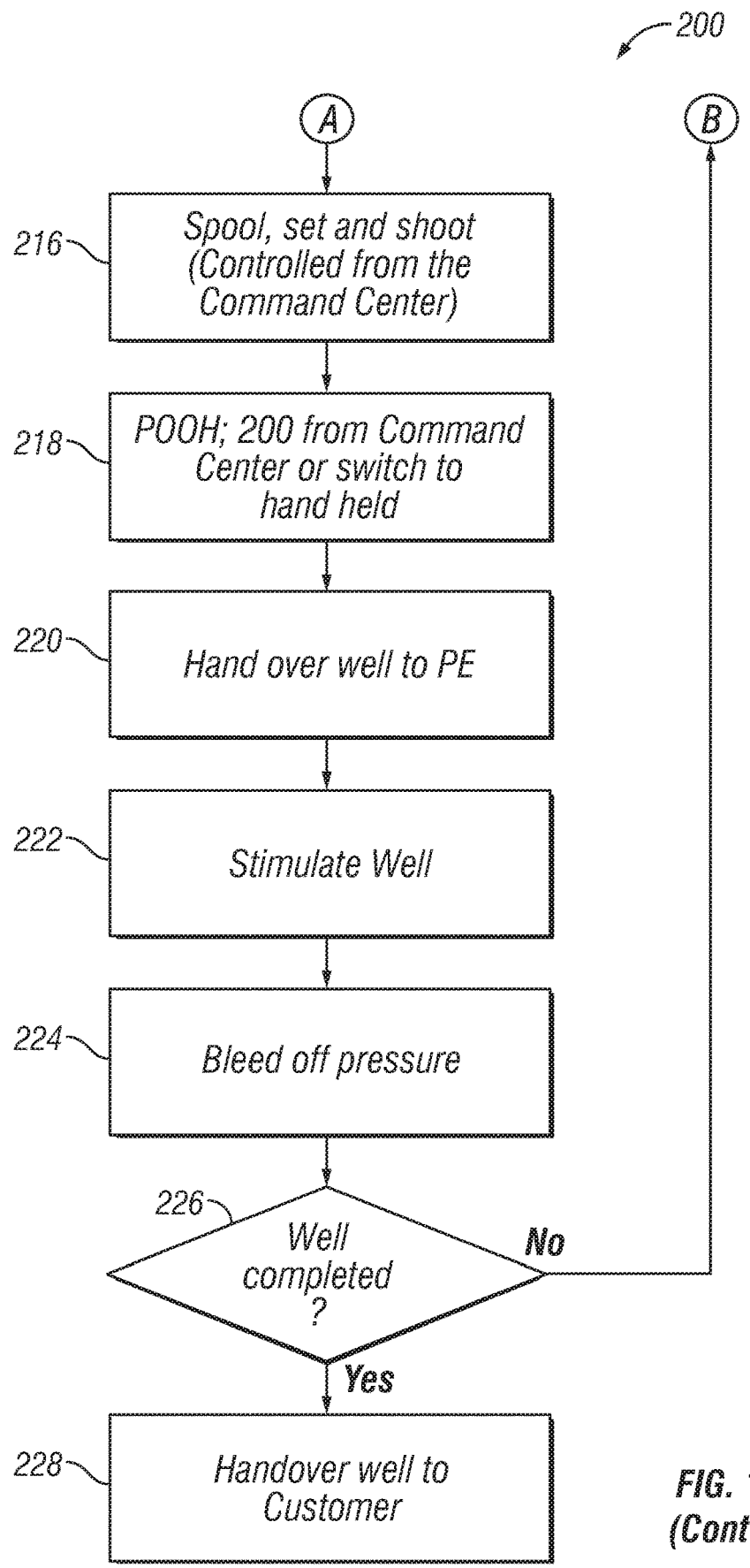
Figure 11:
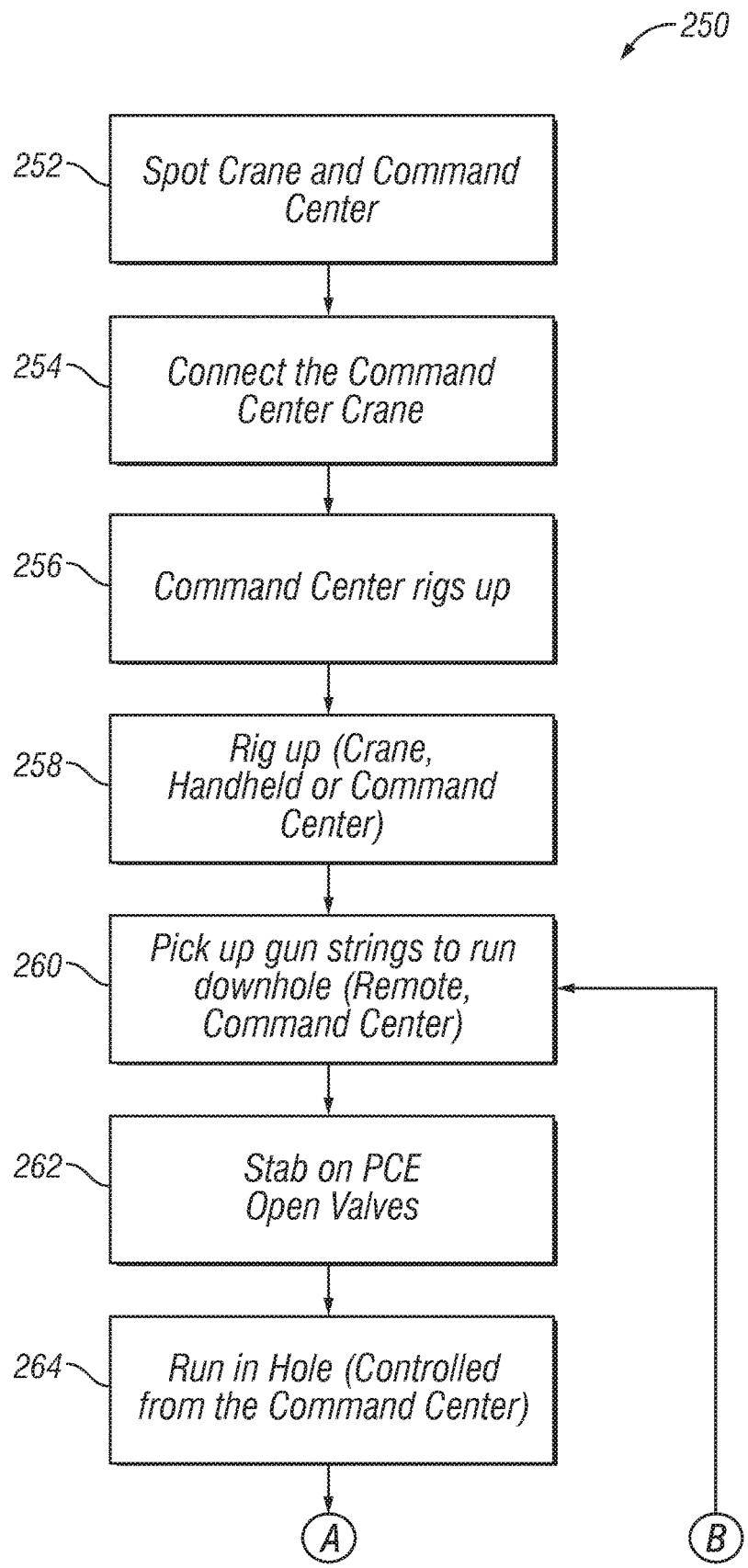
FIG. 11 illustrates a flow chart for a perforation operation according to the system of FIG. 4, according to one or more embodiments.
Figure 11:
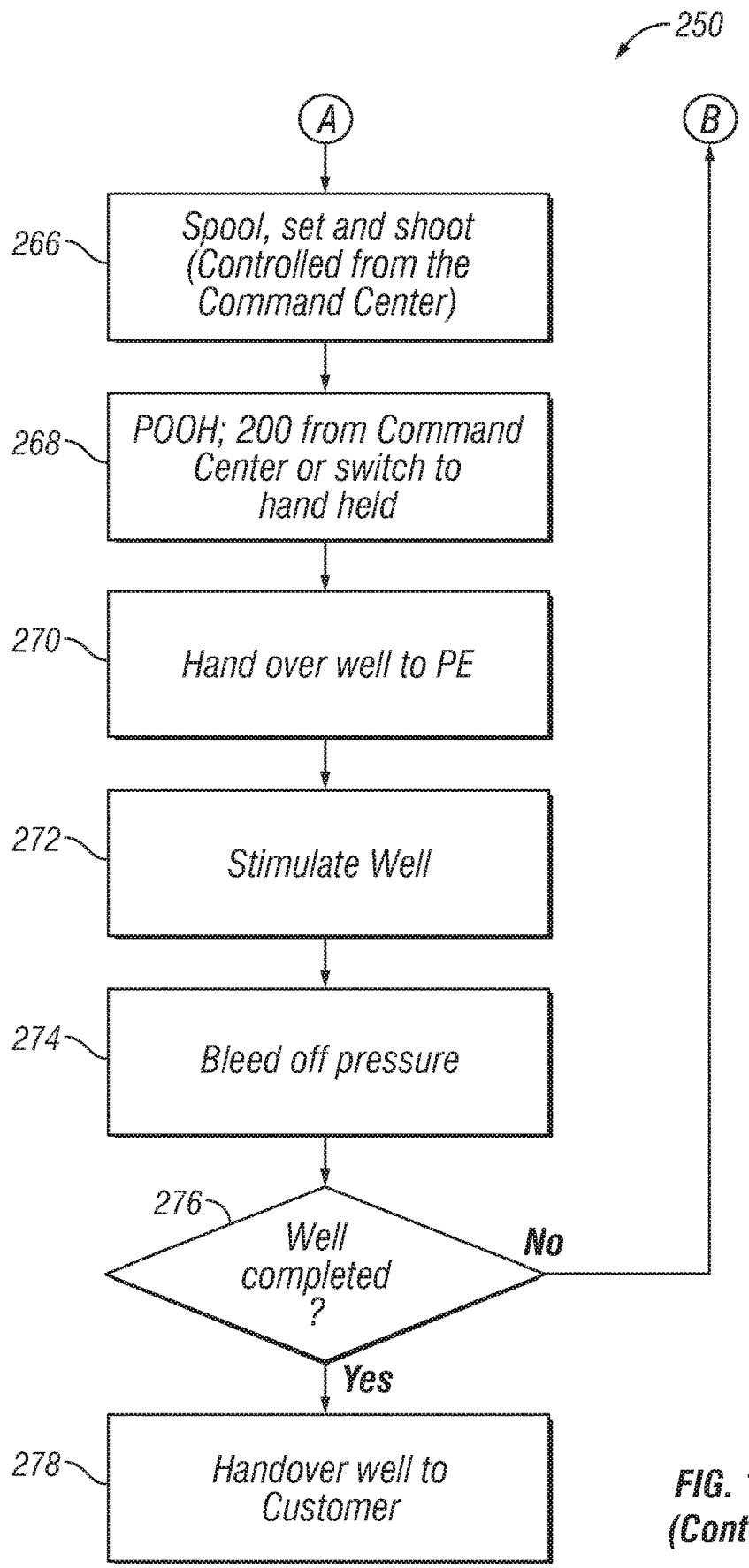

Provided in FIGS. 10 and 11 are example methodologies and flow charts for using a system in accordance with the present disclosure. The flow chart in FIG. 10 is an example methodology for a perforation operation according to the system shown in FIG. 3, and the flow chart in FIG. 11 is an example methodology for a perforation operation according to the system shown in FIG. 4.

For example, in FIG. 10, a flow chart 200 includes spotting a wireline unit (e.g., the reel, the conveyance, and the tool), the crane, and the command center at step 202. Then, the command center is connected to the wireline truck in step 204. As described above, the command center may be connected either wirelessly, or by a physical connection, such as the umbilical.

Next, in steps 206, 208, the components of the system are rigged up. For example, in step 206, the command center is rigged up to connect to the movable structure, the reel, the crane, the pressure control equipment (PCE), the pump down pumps, and the fracturing pumps. In step 208, the wireline unit is rigged up via the command center or the remote control described above.

After rigging up, the system may be prepared to commence a specific operation, such as a perforating operation. As such, the perforating gun strings may be picked up to place the perforating gun strings in position to be run into the well in step 210. The perforating gun strings may be picked up by the crane, which may be operated by the command center or the remote control.

In step 212, a stab on the PCE is utilized to open the valves. This enables the perforating gun strings to enter the well and run to the desired location downhole. As such, the perforating gun strings are run downhole into the well in step 214. Further, the running of the perforating gun strings is controlled by the command center. Then, the perforating gun strings are reeled into the well, set against the wellbore, and shot to perforate the wellbore in step 216. The command center controls the reeling (e.g., by controlling the reel), setting, and shooting of the perforating gun strings.

After the perforating gun strings are shot, and the wellbore is perforated, the perforating gun strings are pulled out of the hole (POOH) in step 218. Further, controlling the pull out of the perforating gun strings is performed by the hand held remote control at least two hundred feet from the command center or the control console.

At this point, the perforating operation has been completed, and operation of the well is handed over to a production enhancement (PE) operator in step 220. Then, the PE stimulates the well to enhance the productivity of the well in step 222. Next, excess pressure is bled off from the well to further enhance the productivity of the well in step 224.

Then, the operator of the well determines, at step 226, whether the well is completed. If the well is not completed, the flow chart 200 returns to step 210 to begin another perforating operation. If the well is completed, the well is ready to hand over to a customer in step 228.

In FIG. 11, a flow chart 250 includes spotting the crane and the command center at step 252. Spotting the wireline unit in step 252 is unnecessary as the wireline unit is integrated with the crane. Then, the command center is connected to the crane in step 254. As described above, the command center may be connected either wirelessly, or by a physical connection, such as the umbilical.

Next, in steps 256, 258, the components of the system are rigged up. For example, in step 256, the command center is rigged up to connect to the movable structure, the reel, the crane, the pressure control equipment (PCE), the pump down pumps, and the fracturing pumps. In step 258, the wireline unit is rigged up via the command center or the remote control described above.

After rigging up, the system may be prepared to commence a specific operation, such as a perforating operation. As such, the perforating gun strings may be picked up to place the perforating gun strings in position to be run into the well in step 260. The perforating gun strings may be picked up by the crane, which may be operated by the command center or the remote control.

In step 262, a stab on the PCE is utilized to open the valves. This enables the perforating gun strings to enter the well and run to the desired location downhole. As such, the perforating gun strings are run downhole into the well in step 264. Further, the running of the perforating gun strings is controlled by the command center. Then, the perforating gun strings are reeled into the well, set against the wellbore, and shot to perforate the wellbore in step 266. The command center controls the reeling (e.g., by controlling the reel), setting, and shooting of the perforating gun strings.

After the perforating gun strings are shot, and the wellbore is perforated, the perforating gun strings are pulled out of the hole (POOH) in step 268. Further, controlling the pull out of the perforating gun strings is performed by the hand held remote control at least two hundred feet from the command center or the control console.

At this point, the perforating operation has been completed, and operation of the well is handed over to a production enhancement (PE) operator in step 270. Then, the PE stimulates the well to enhance the productivity of the well in step 272. Next, excess pressure is bled off from the well to further enhance the productivity of the well in step 274.

Then, the operator of the well determines, at step 276, whether the well is completed. If the well is not completed, the flow chart 250 returns to step 260 to begin another perforating operation. If the well is completed, the well is ready to hand over to a customer in step 278.

Figure 12:
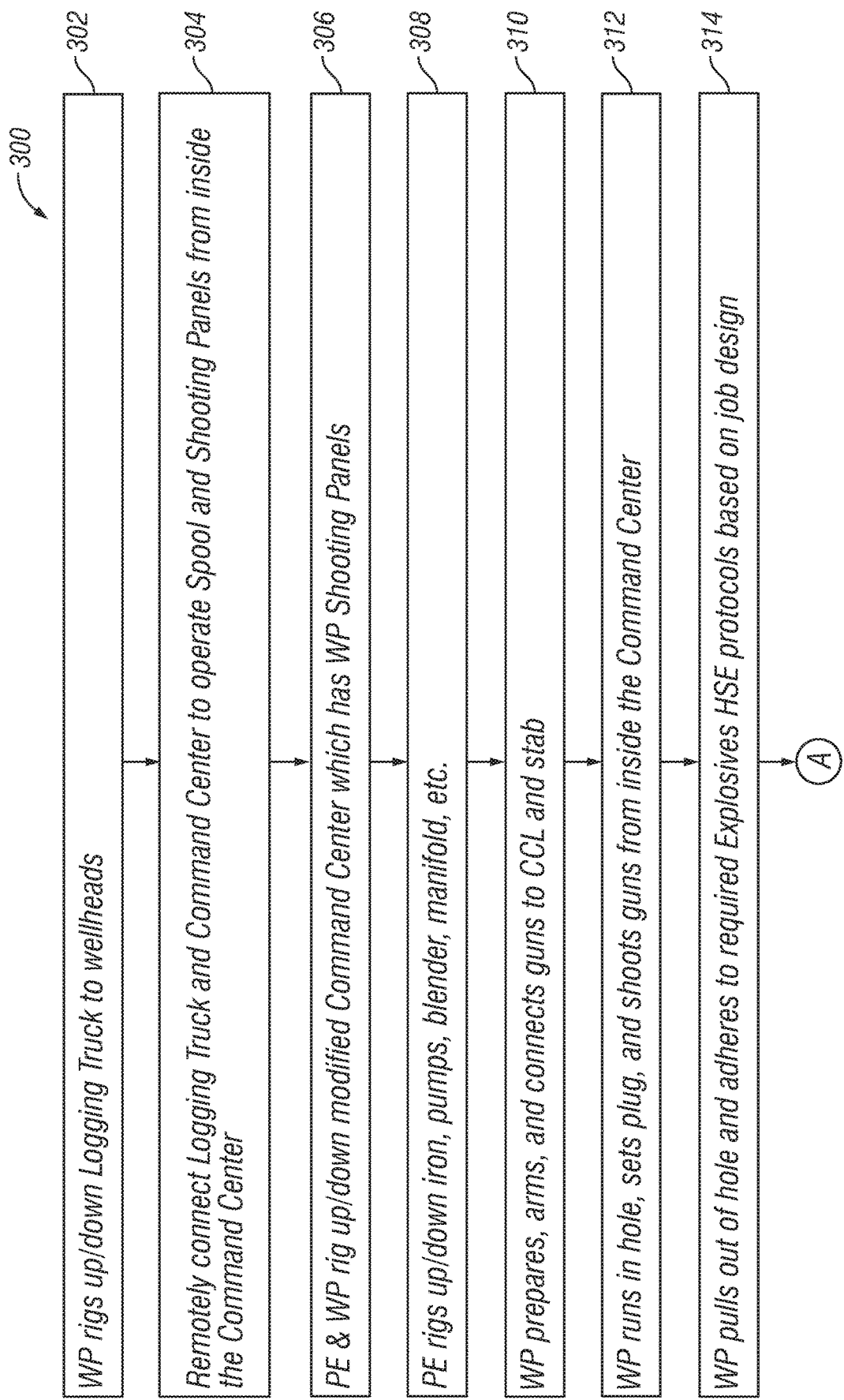
FIG. 12 illustrates a flow chart for a perforation operation according to the system of FIG. 3, according to one or more embodiments.
Figure 12:
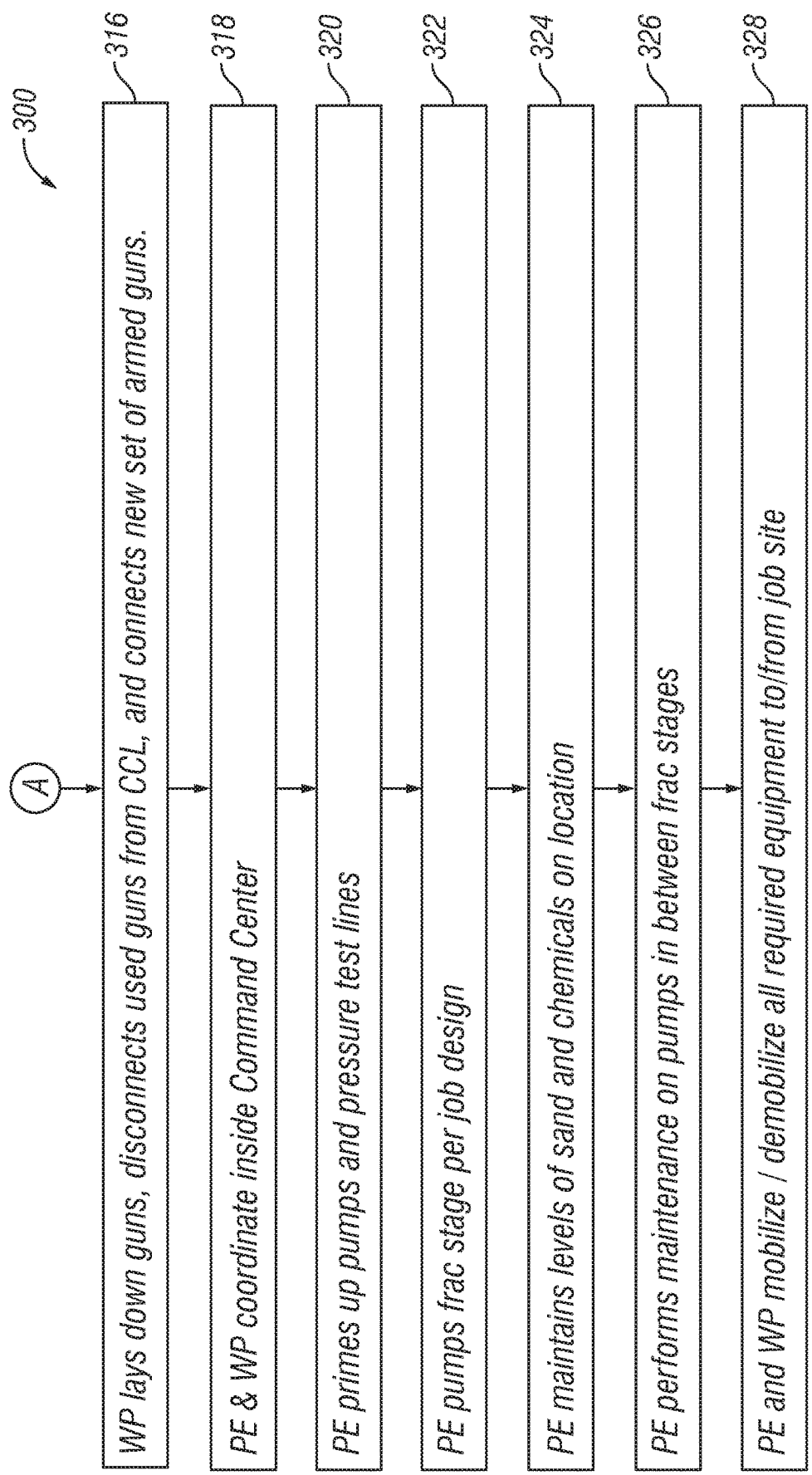
Figure 13:
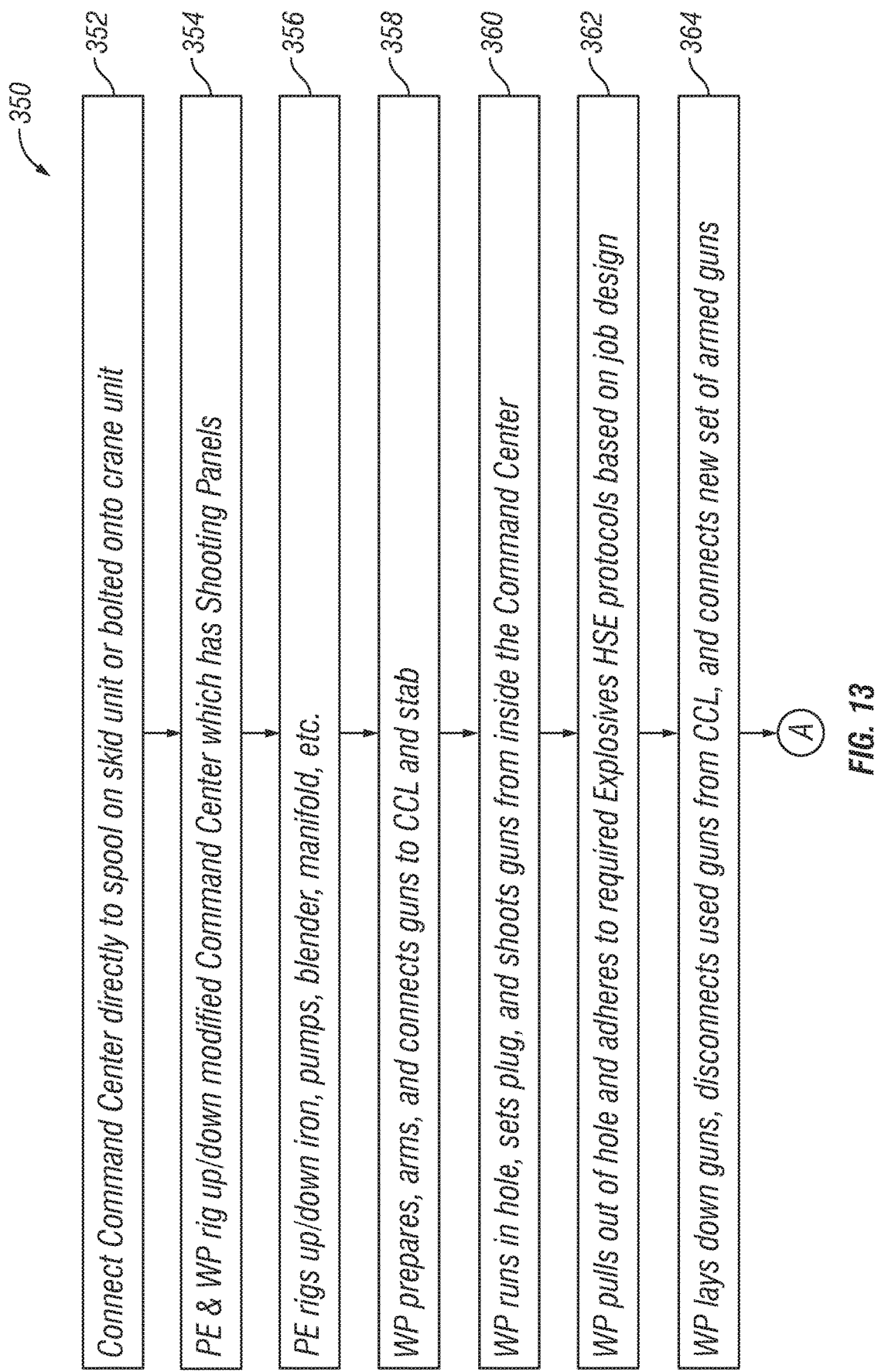
FIG. 13 illustrates a flow chart for a perforation operation according to the system of FIGS. 4 and 5, according to one or more embodiments.
Figure 13:
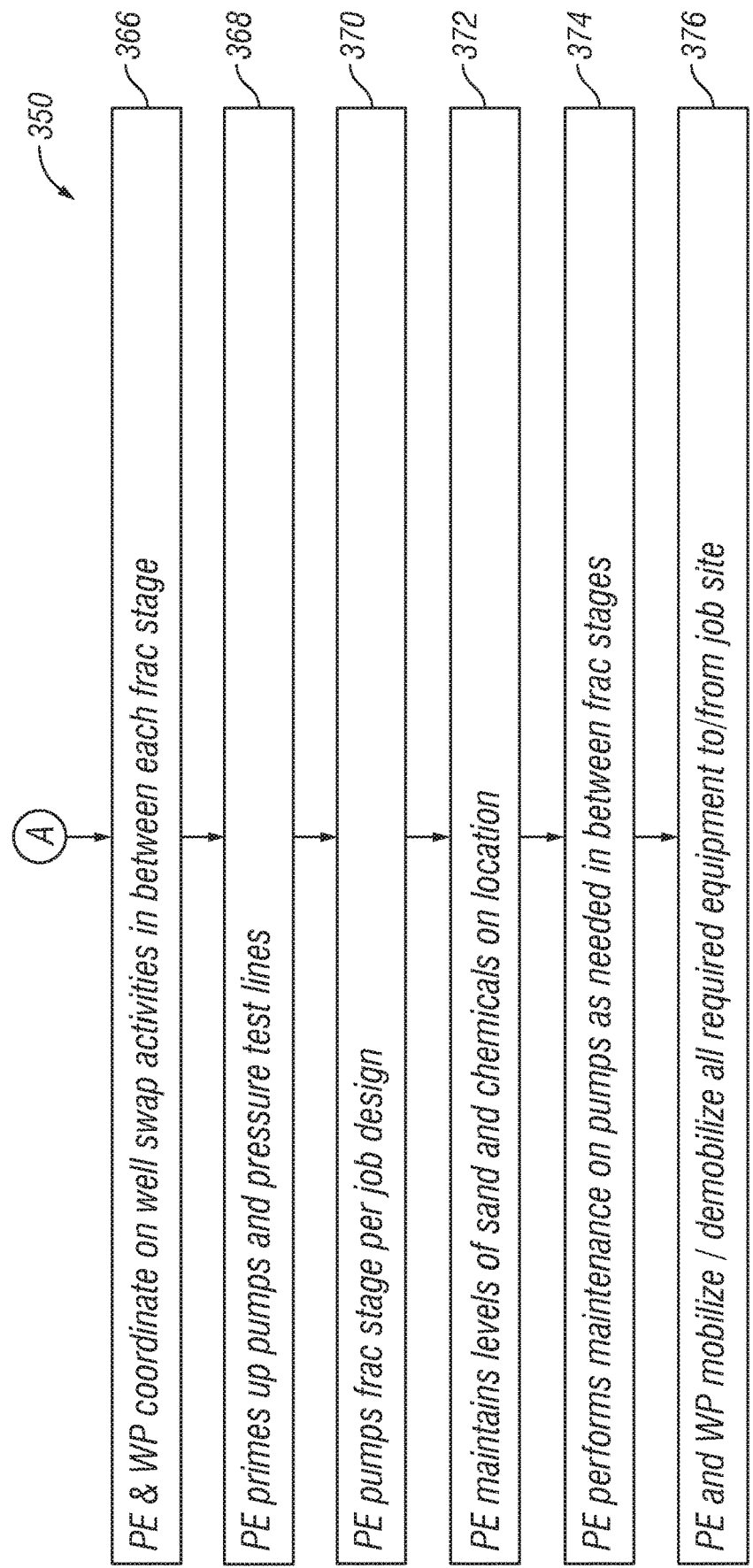

Further, provided in FIGS. 12 and 13 are additional example methodologies and flow charts for using a system in accordance with the present disclosure. These methodologies and flow charts may provide more details than those discussed and provided above. FIG. 12 illustrates a flow chart 300 for a perforation operation according to the system shown in FIG. 3. FIG. 13 illustrates a flow chart 350 for a perforation operation according to the system shown in FIGS. 4 and 5.

For example, FIG. 12 includes a wireline and perforating operator (WP) rigs up the movable structure and reel to the wellhead in step 302. Further, shooting panels may be present in the movable structure for contingency. Then, the WP remotely connects the movable structure and the command center in step 304 to operate the reel and shooting panels from inside the command center. As described above audio and video equipment may be included within the command center and at the reel to monitor the reel from inside the command center.

Then, the production enhancement operator (PE) and the WP rig up the command center in step 306. This command center includes WP shooting panels inside the command center. Further, the command center may be utilized to perform quality control and/or quality assurance. In some embodiments, a portable quality control and/or quality assurance lab may be brought onto the wellsite. Then, the PE rigs the iron, the pumps, the blender, the manifold, etc. in step 308.

After rigging, the WP prepares, arms, and connects the perforating guns from inside the command center in step 310. Then, the WP, in step 312, runs the perforating guns into the well, sets the plug to maintain the position of the perforating guns, and shoots the guns to perforate the wellbore, all from inside the command center. After the perforating guns are shot, the WP pulls the perforating guns out of the well in step 314. While pulling out the guns, the WP adheres to the explosive health, safety, and environment protocols, which change based on the job design. For example, the protocols may require radio silence, waiting at two hundred feet, etc. Next, the WP lays down the perforating guns, disconnects the guns from the casing collar locator (CCL), and connects a new set of armed perforating guns in step 316.

Then, the PE and the WP coordinate via face-to-face communication inside the command center on well swap activities in step 318. The activities include bleed off well, open well lubricator disconnect/re-connect, explosive exclusion zones, pump maintenance, wireline (WL) re-head, grease valves, pressure testing, well equalizing, etc. Further, the communication in step 318 may occur between each fracturing stage.

After coordinating, the PE primes up the pumps and pressure test lines in step 320. Then, the PE pumps each fracturing stage according to the specific job design in 322. Meanwhile, the PE also maintains levels of sand and chemicals on location in step 324. Between fracturing stages, the PE may perform maintenance on pumps according to a schedule or on an as-needed basis in step 326.

After the fracturing stages, the PE and WP mobilize/demobilize all required equipment to/from the job site in step 328. For example, one or more of the command center, the reel, the movable structure, the crane, the pumps, etc. may no longer be used at the particular job site. Accordingly, the PE and/or WP may remove unneeded equipment from the job site so that the equipment may be put to use at another job site. Further, if additional equipment becomes needed on the job site, the PE and/or WP may bring in the additional equipment. For example, a mobile quality control and/or quality assurance lab may be brought to the job site.

FIG. 13 illustrates the flow chart 350 for a perforation operation according to the systems shown in FIGS. 4 and 5. For example, the WP connects, in step 352, the command center directly to the reel that is located on either the skid unit or the crane. As described above audio and video equipment may be included within the command center and at the reel to monitor the reel from inside the command center.

Then, the PE and WP rig up the command center in step 354. This command center includes WP shooting panels inside the command center. Further, the command center may be utilized to perform quality control and/or quality assurance. In some embodiments, a portable quality control and/or quality assurance lab may be brought onto the wellsite. Then, the PE rigs the iron, the pumps, the blender, the manifold, etc. in step 356.

After rigging, the WP prepares, arms, and connects the perforating guns from inside the command center in step 358. Then, the WP, in step 360, runs the perforating guns into the well, sets the plug to maintain the position of the perforating guns, and shoots the guns to perforate the wellbore, all from inside the command center. After the perforating guns are shot, the WP pulls the perforating guns out of the well in step 362. While pulling out the guns, the WP adheres to the explosive health, safety, and environment protocols, which change based on the job design. For example, the protocols may require radio silence, waiting at two hundred feet, etc. Next, the WP lays down the perforating guns, disconnects the guns from the casing collar locator (CCL), and connects a new set of armed perforating guns in step 364.

Then, the PE and the WP coordinate via face-to-face communication inside the command center on well swap activities in step 366. The activities include bleed off well, open well lubricator disconnect/re-connect, explosive exclusion zones, pump maintenance, wireline (WL) re-head, grease valves, pressure testing, well equalizing, etc. Further, the communication in step 366 may occur between each fracturing stage.

After coordinating, the PE primes up the pumps and pressure test lines in step 368. Then, the PE pumps each fracturing stage according to the specific job design in 370. Meanwhile, the PE also maintains levels of sand and chemicals on location in step 372. Between fracturing stages, the PE may perform maintenance on pumps according to a schedule or on an as-needed basis in step 374.

After the fracturing stages, the PE and WP mobilize/demobilize all required equipment to/from the job site in step 376. For example, one or more of the command center, the reel, the movable structure, the crane, the pumps, etc. may no longer be used at the particular job site. Accordingly, the PE and/or WP may remove unneeded equipment from the job site so that the equipment may be put to use at another job site. Further, if additional equipment becomes needed on the job site, the PE and/or WP may bring in the additional equipment. For example, a mobile quality control and/or quality assurance lab may be brought to the job site.

This present disclosure may be used to create an integrated completions service delivery system that delivers remotely operated well stimulation or completion from a centralized location. This may involve integration of personnel, integration of equipment, and may involve integration/automation of perforating services, stimulations services, completion services, mechanical services, surface pressure management services, and/or pump down services. This may enable one to have a smaller foot print at location, greater surface efficiency, reduce cost structure and ultimately drive for a faster more effective well completions operation. Further advantages may include a reduced footprint, ability to operate in a smaller pad, ability to improve transition time between wells, decreased time to well completion, reduction in operational health, safety, and environment risk, reconfiguration of layout of equipment at location, enablement for better decision making, centralization of data gathering, and/or reduction in cost structure.

Further examples may include:

Example 1 is a system to manage a tool on a conveyance from a surface of a wellbore, comprising a remotely controllable reel configured to receive the conveyance about the reel and remotely controllable to distribute the conveyance into or out of the wellbore; and a crane positionable to support the conveyance between the reel and the wellbore.

In Example 2, the subject matter of Example 1 can further include a remote controller connectable to the remotely controllable reel so as to be configured to communicate with and control the remotely controllable reel.

In Example 3, the subject matter of Examples 1-2 can further include a command center connectable to the remotely controllable reel so as to be configured to communicate with and control the remotely controllable reel.

In Example 4, the subject matter of Examples 1-3 can further include wherein the remotely controllable reel is positionable upon a movable structure.

In Example 5, the subject matter of Examples 1-4 can further include wherein the movable structure comprises a vehicle, trailer, or skid.

In Example 6, the subject matter of Example 1-5 can further include wherein the remotely controllable reel is positionable upon the crane, wherein the crane comprises a base and a boom rotatable and translatable with respect to the base.

In Example 7, the subject matter of Examples 1-6 can further include wherein the remotely controllable reel is positioned upon the boom and is rotatable and translatable with the boom with respect to the base.

In Example 8, the subject matter of Examples 1-7 can further include wherein the conveyance comprises a wireline, cable, E-line, Z-line, jointed pipe, coiled tubing, casing, or liner string.

In Example 9, the subject matter of Examples 1-8 can further include wherein the remotely controllable reel is controllable using wireless communication.

In Example 10, the subject matter of Examples 1-9 can further include a fracturing pump configured to pump fracturing fluid into the wellbore; a pump down pump configured to pump fluid into the wellbore to deploy the tool; and wherein a command center connectable to either or both of the fracturing pump and the pump down pump so as to be configured to communicate with and control either or both.

In Example 11, the subject matter of Examples 1-10 can further include wherein the command center connectable to the crane so as to be configured to communicate with and control the crane.

In Example 12, the subject matter of Examples 1-11 can further include pressure control equipment connectable to either or both of the fracturing pump and the pump down pump so as to be configured to control pressure in the wellbore; and wherein the command center is connectable to the pressure control equipment so as to be configured to communicate with and control the pressure control equipment.

In Example 13, the subject matter of Examples 1-12 can further include a control console operatively coupled to the remotely controllable reel to change the remotely controllable reel between a remotely controllable mode for remotely controlling the remotely controllable reel and a manual mode for manually controlling the remotely controllable reel.

Example 14 is a method of moving a tool on a conveyance in a wellbore from the surface, comprising remotely controlling a reel at the surface, the conveyance being wound on the reel with the tool attached to the conveyance, to move the conveyance into or out of the wellbore; and supporting the conveyance with a crane between the reel and the wellbore.

In Example 15, the subject matter of Example 14 can further include wherein the reel is remotely controlled from a remote controller or a command center.

In Example 16, the subject matter of Examples 14-15 can further include positioning the reel upon a movable structure; and positioning the reel upon the crane.

In Example 17, the subject matter of Examples 14-16 can further include wherein the positioning the reel upon the crane comprises positioning the reel upon a boom of the crane such that the reel is rotatable and translatable with the boom with respect to a base of the crane.

In Example 18, the subject matter of Examples 14-17 can further include wherein the conveyance comprises a wireline, cable, E-line, Z-line, jointed pipe, coiled tubing, casing, or liner string.

In Example 19, the subject matter of Examples 14-18 can further include remotely controlling the reel using wireless communication.

In Example 20, the subject matter of Examples 14-19 can further include at least one or any combination of remotely controlling a fracturing pump to pump fracturing fluid into the wellbore from a command center; remotely controlling a pump down pump to pump fluid into the wellbore to deploy the tool from the command center; remotely controlling the crane to support the conveyance from the command center; or remotely controlling pressure control equipment for controlling pressure in the wellbore from the command center.

The detailed description refers to the accompanying drawings that show, by way of illustration and not limitation, various embodiments in which the invention may be practiced. These embodiments are described in sufficient detail to enable those skilled in the art to practice these and other embodiments. Other embodiments may be utilized, and structural, logical, and electrical changes may be made to these embodiments. The various embodiments are not necessarily mutually exclusive, as some embodiments can be combined with one or more other embodiments to form new embodiments. The detailed description is, therefore, not to be taken in a limiting sense.

Although specific embodiments have been illustrated and described herein, it will be appreciated by those of ordinary skill in the art that any arrangement that is calculated to achieve the same purpose may be substituted for the specific embodiments shown. Various embodiments use permutations and/or combinations of embodiments described herein. It is to be understood that the above description is intended to be illustrative, and not restrictive, and that the phraseology or terminology employed herein is for the purpose of description. Combinations of the above embodiments and other embodiments will be apparent to those of ordinary skill in the art upon studying the above description.

What is claimed is:

1. A system to manage a tool on a conveyance from a surface of a wellbore, comprising:
   a remotely controllable reel configured to receive the conveyance about and deploy the conveyance from the reel and remotely controllable to rotate to move the conveyance into or out of the wellbore; and
   a crane positionable to support the conveyance between the reel and the wellbore.

2. The system of claim 1, further comprising a remote controller connectable to the remotely controllable reel so as to be configured to communicate with and control the remotely controllable reel.

3. The system of claim 1, further comprising a command center connectable to the remotely controllable reel so as to be configured to communicate with and control the remotely controllable reel.

4. The system of claim 1, wherein the remotely controllable reel is positionable upon a movable structure.

5. The system of claim 4, wherein the movable structure comprises a vehicle, trailer, or skid.

6. The system of claim 1, wherein the remotely controllable reel is positionable upon the crane, wherein the crane comprises a base and a boom rotatable and translatable with respect to the base.

7. The system of claim 6, wherein the remotely controllable reel is positioned upon the boom and is rotatable and translatable with the boom with respect to the base.

8. The system of claim 1, wherein the conveyance comprises a wireline, cable, E-line, Z-line, jointed pipe, coiled tubing, casing, or liner string.

9. The system of claim 1, wherein the remotely controllable reel is controllable using wireless communication.

10. The system of claim 1, further comprising:
    a fracturing pump configured to pump fracturing fluid into the wellbore;
    a pump down pump configured to pump fluid into the wellbore to deploy the tool; and
    wherein a command center connectable to either or both of the fracturing pump and the pump down pump so as to be configured to communicate with and control either or both.

11. The system of claim 10, wherein the command center connectable to the crane so as to be configured to communicate with and control the crane.

12. The system of claim 10, further comprising:
    pressure control equipment connectable to either or both of the fracturing pump and the pump down pump so as to be configured to control pressure in the wellbore; and
    wherein the command center is connectable to the pressure control equipment so as to be configured to communicate with and control the pressure control equipment.

13. The system of claim 1, further comprising a control console operatively coupled to the remotely controllable reel to change the remotely controllable reel between a remotely controllable mode for remotely controlling the remotely controllable reel and a manual mode for manually controlling the remotely controllable reel.

14. A method of moving a tool on a conveyance in a wellbore from the surface, comprising:
    remotely controlling a reel at the surface, the conveyance being wound on and deployed from the reel with the tool attached to the conveyance, to rotate the reel and move the conveyance into or out of the wellbore; and
    supporting the conveyance with a crane between the reel and the wellbore.

15. The method of claim 14, wherein the reel is remotely controlled from a remote controller or a command center.

16. The method of claim 14, further comprising one of:
    positioning the reel upon a movable structure; and
    positioning the reel upon the crane.

17. The method of claim 16, wherein the positioning the reel upon the crane comprises positioning the reel upon a boom of the crane such that the reel is rotatable and translatable with the boom with respect to a base of the crane.

18. The method of claim 14, wherein the conveyance comprises a wireline, cable, E-line, Z-line, jointed pipe, coiled tubing, casing, or liner string.

19. The method of claim 14, further comprising remotely controlling the reel using wireless communication.

20. The method of claim 14, further comprising at least one or any combination of:
    remotely controlling a fracturing pump to pump fracturing fluid into the wellbore from a command center;
    remotely controlling a pump down pump to pump fluid into the wellbore to deploy the tool from the command center;
    remotely controlling the crane to support the conveyance from the command center; or
    remotely controlling pressure control equipment for controlling pressure in the wellbore from the command center.

* * * * *